Sept. 14, 1943.   R. ASH   2,329,316
WATER REPLENISHER FOR COOKING VESSELS
Filed Aug. 31, 1942    2 Sheets-Sheet 1

RALPH ASH,
INVENTOR.

BY Hazard & Miller

ATTORNEYS.

RALPH ASH,
INVENTOR.

BY Hazard & Miller

ATTORNEYS.

Patented Sept. 14, 1943

2,329,316

UNITED STATES PATENT OFFICE 2,329,316

WATER REPLENISHER FOR COOKING VESSELS

Ralph Ash, Los Angeles, Calif.

Application August 31, 1942, Serial No. 456,744

4 Claims. (Cl. 53—1)

This invention relates to a water replenisher for cooking vessels.

An object of the invention is to provide a device that may be placed in a cooking vessel which will maintain a constant low level of water or other liquid in the cooking vessel during cooking. Heretofore it has been customary practice in cooking various vegetables to immerse them in water in a cooking vessel which is brought to a boil and maintained at boiling temperature for the required length of time. This procedure has been recognized as disadvantageous in that many vitamins naturally present in the vegetables are destroyed by the boiling water. Also, nutritious juices in the vegetables are extracted therefrom by the boiling water and are poured off and wasted primarily because the dilution of the juices is so great that it is not advantageous to save them. If an attempt is made to cook vegetables in an ordinary cooking vessel with a very small amount of water therein advantages are gained in the preservation of the vitamins and the lack of juice extraction, but there is constant danger of the small amount of water boiling off resulting in the burning or scorching of the vegetables. This is particularily true when the cooking vessel is covered.

By means of the present invention it is possible to constantly maintain a small amount of water in the bottom of the cooking vessel wherein water is constantly being supplied to replace the water or liquid that is vaporizing or boiling off. Thus, the vegetables are effectively steamed during the cooking resulting in a preservation of the vitamins, a lack of unnecessary extraction of vegetable juices and in those juices that are extracted being retained in the water at a suitable concentration so that they can be advantageously consumed later, either as extracted juices or in soup stocks.

Another object of the invention is to provide a device of the above general characteristics which is of relatively simple and inexpensive construction and which is highly satisfactory in its operation.

With the foregoing and other objects in view, which will be made manifest in the following detailed description and specifically pointed out in the appended claims, reference is had to the accompanying drawings for an illustrative embodiment of the invention, wherein:

Figure 1:
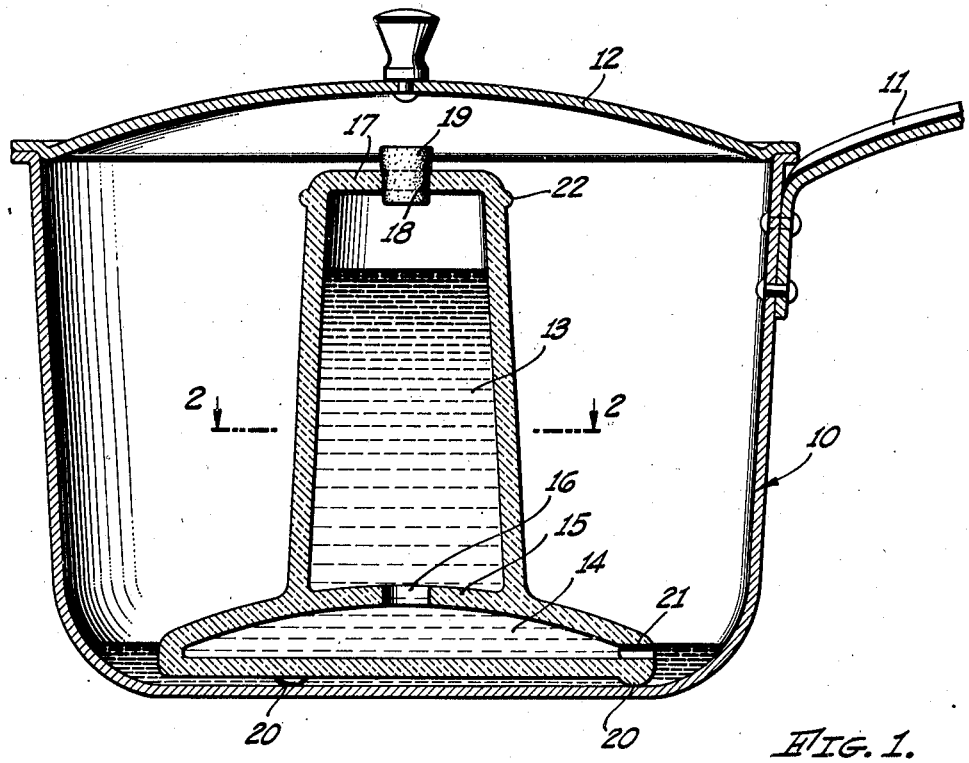
Figure 1 is a sectional view of a cooking vessel illustrating the water replenisher embodying the present invention as installed therein, the water replenisher being mostly shown in vertical section.

Referring to the accompanying drawings wherein similar reference characters designate similar parts throughout, 10 indicates any conventional pot or cooking vessel normally equipped with a handle 11 and a removable cover 12. The water replenisher embodying the present invention is preferably made of a glazed ceramic although any other material that is inert to juices normally present in cooking may be employed provided it can be readily cleaned.

The water replenisher comprises a receptacle that provides a main reservoir 13 disposed above an auxiliary or outlet reservoir 14. These reservoirs are defined from each other by a partition 15 in which is formed an aperture 16 providing for communication between the reservoirs. The outlet or auxiliary reservoir 14 is preferably shallow and quite extensive in area, whereas the main reservoir is largely upright. The upper or main reservoir 13 is covered as indicated at 17 in which there is a filling aperture 18 that is normally closed, such as by a removable cork 19. On the bottom of the steam ball there are a plurality of supporting legs in the form of protuberances 20 which rest on the bottom of the cooking vessel 10 so as to support the bottom of the auxiliary reservoir 14 in small but spaced relationship to the bottom of the cooking vessel. An outlet 21 is provided which permits water or other liquid placed in the device to be constantly fed to the cooking vessel 10.

The use and the advantages of the construction are briefly as follows: The device is first filled with water or other liquid, this being accomplished by removing the cork 19 and pouring in the water through the opening 18 while the outlet 21 is held closed as by the finger. When the replenisher has thus been adequately filled the cork 19 is replaced and the device bodily positioned in the cooking vessel 10. Some water will be discharged through the outlet 21 into the cooking vessel due to the vapor pressure that may be present under the existing conditions on top of the water in the main reservoir 13. The vegetables or other food that is to be cooked is then deposited in the cooking vessel, being supported partially on top of the auxiliary reservoir 14 and between the walls of the main reservoir 13 and the walls of the cooking vessel. The cooking vessel is then heated by placing it on a stove or heater in any conventional manner.

It will be noted that by this construction that the level of liquid in the cooking vessel 10 does not normally exceed the height of the top of the outlet 21. This small volume of water in the bottom of the cooking vessel which is thus released can be quickly brought to a boil with a minimum consumption of fuel. The boiling water generates steam which rises around and between the vegetables or other food that is in the cooking vessel, effectively cooking the food in a period of time that compares favorably with that required to boil vegetables in the conventional manner. However, the fuel consumed for cooking vegetables with the water replenisher is only a small proportion of that required to cook the same vegetables by the conventional boiling procedure. As the water released into the bottom of the cooking vessel 10 boils away it is constantly being replenished by water that is fed through the outlet 21 from the reservoirs 13 and 14. As the cooking proceeds it will of course be appreciated that the water in the reservoir becomes heated with the result that some vapors are generated therein and occupy the space in the top of the main reservoir 13. These vapors as they are generated allow and cause the water in the steam ball to be expelled therefrom into the cooking vessel as the level of water in the cooking vessel tends to fall due to the boiling. In this way although the cooking vessel may remain constantly closed or covered by the cover 12 the level of the small quantity of water released into the cooking vessel is maintained constant or substantially so so that there is no danger of this water boiling away and allowing the vegetables or food to burn or scorch. By having the replenisher supported by the legs 20 above the bottom of the cooking vessel 10 that water that is between the bottom of the replenisher and the bottom of the cooking vessel may receive heat directly from the stove, boil, and liberate steam which is liberated around the edges of the outlet reservoir 14. When the cooking is completed the food may be removed from the cooking vessel 10 and the replenisher lifted therefrom, an external bead 22 facilitating its removal. If desired, however, the replenisher may be allowed to remain in the cooking vessel until it is cool. The condensation of the water vapor in the top of the main reservoir 13 creates a partial vacuum therein on cooling and this tends to retract into the replenisher a substantial portion of liquid in the bottom of the cooking vessel 10. Consequently, such of the juices as may have been extracted by the steaming operation are in relatively concentrated form in the liquid in the bottom of the cooking vessel and these are retained without any great dilution in the replenisher for subsequent consumption either alone or in soup stocks.

Figure 3:
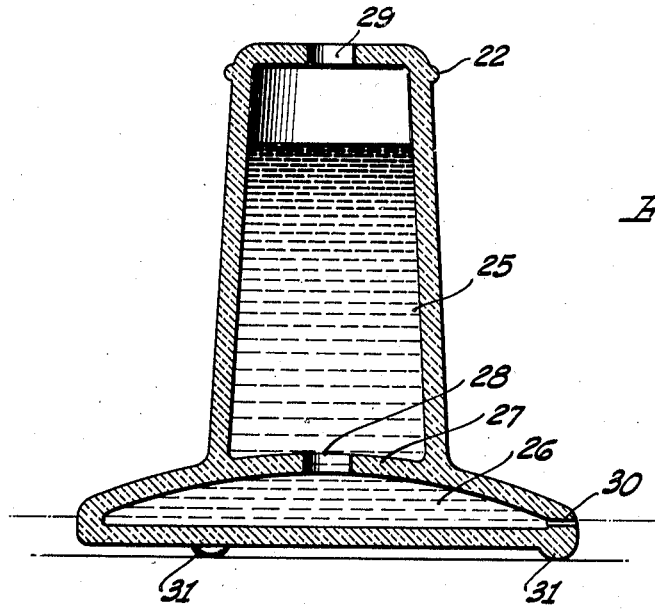
Fig. 3 is a vertical section through a slightly modified form of construction.

In Fig. 3 there is illustrated a slightly modified form of construction wherein the steam ball comprises a main reservoir 25 and an auxiliary or outlet reservoir 26, these being defined from each other by a partition 27 in which there is an aperture 28 providing for communication. The filling aperture 29 is shown in the top of the main reservoir and the outlet is indicated at 30. 31 are the small supporting legs or protuberances that support the replenisher above the bottom of the cooking vessel.

In this form of construction the filling, using, and advantages are substantially the same as that previously described although no closure is inserted in the filling aperture 29. Instead of closing the top of the main reservoir it is allowed to remain constantly open. The supply of liquid to the bottom of the cooking vessel is controlled by the size and length of the outlet aperture 30, this being made of sufficient size and length so as to maintain a constant feed of water to the cooking vessel at approximately the same rate at which it boils off. Thus, in a cooking vessel of normal size it is desirable to supply or feed water thereto at the rate of approximately six fluid ounces per hour. By making the aperture 30 in this form approximately $1/100''$ in diameter and approximately $1/8''$ long this rate of water feed to the cooking vessel may be accomplished. The size and length of the aperture 30 will of course vary somewhat depending upon the size and shape of the cooking vessel in which the device is to be used.

Figure 2:
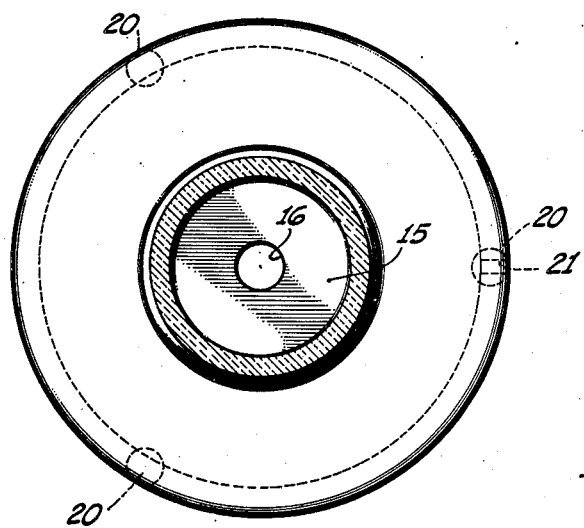
Fig. 2 is a horizontal section through the water replenisher taken substantially upon the line 2—2 upon Fig. 1 in the direction indicated.
Figure 4:
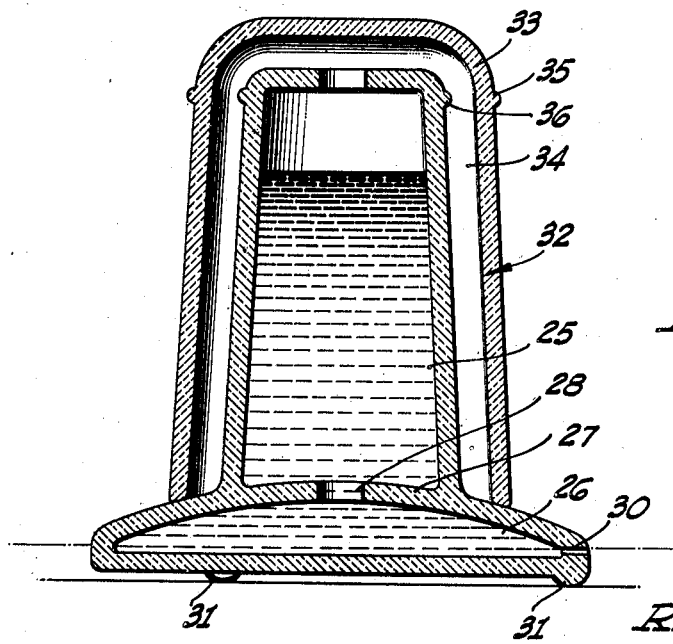
Fig. 4 is a vertical section through still a further construction embodying the present invention.

In Fig. 4 there is illustrated a further form of construction wherein the replenisher generally indicated at 32 may be either of the construction illustrated in Figs. 1 and 2 or the construction illustrated in Fig. 3. Thereover there is positioned an inverted cup 33 which covers the main reservoir 13 or 25 as the case may be. This cup is of such size and shape as to be disposed in spaced relation to the main reservoir so as to provide a dead air space 34 which serves to insulate the main reservoir against heat. Consequently with this form of construction the water in the main reservoir which remains relatively cool does not tend to extract heat from the vegetables or food that is being cooked nor does it function as a condenser for steam generated by the released liquid in the bottom of the cooking vessel. Other means for insulating the main reservoir against heat may be employed besides the dead air space 34 and accomplish similar results. 35 and 36 indicate beads that may be formed on the top and on the replenisher respectively to facilitate it being grasped for removal from the cooking vessel.

From the above-described construction it will be appreciated that the improved replenisher is of relatively simple, inexpensive, and sturdy construction, serving to maintain a small but constant supply of water in the bottom of the cooking vessel whereby foods placed in the cooking vessel are effectively steamed as distinguished from being immersed in and boiling in a large volume of water. In this manner vitamins in the foods are not destroyed and leeching out of vegetable juices is reduced to a minimum. I have found that various types of vegetables may be placed in the same cooking vessel and cooked together without having the flavor of one vegetable influenced by the presence of another. For example, beets may be placed in the same cooking vessel around the replenisher along with other vegetables without the beets affecting the flavor of other vegeatbles or discoloring them, although they may be in direct contact.

While the size and shape of the replenisher may vary I find it desirable to have it of such size as to contain approximately eleven or twelve ounces of water when used with the average cooking vessel. In all instances it is desirable to have the replenisher sufficiently short so that it will not interfere with the application of the cover 12.

While the provision of the reservoirs is shown as accomplished by a separate device that may be positioned in and removed from the cooking vessel, it will be appreciated that if desired the cooking vessel and replenisher may be constructed integral with each other and accomplish the same advantageous results.

Various changes may be made in the details of construction without departing from the spirit or scope of the invention as defined by the appended claims.

I claim:

1. A water replenisher for cooking vessels comprising means providing a liquid reservoir adapted to be removably positioned in a cooking vessel, said reservoir being divided by a partition into two compartments, one arranged above the other, the lower compartment being of greater width than the upper compartment, there being a constantly open passage through the partition establishing communication between the compartments, and an outlet for liquid from the lower compartment.

2. A water replenisher for cooking vessels comprising means providing a liquid reservoir adapted to be removably positioned in a cooking vessel, said reservoir being divided by a partition into two compartments, one arranged above the other, the lower compartment being of greater width than the upper compartment, there being a constantly open passage through the partition establishing communication between the compartments, an outlet for liquid from the lower compartment, and means defining a closed insulating space around the upper compartment.

3. A water replenisher for cooking vessels comprising means providing a liquid reservoir adapted to be removably positioned in a cooking vessel, said reservoir being divided by a partition into two compartments, one arranged above the other, the lower compartment being wider than the upper compartment, there being a constantly open aperture through the partition establishing communication between the compartments, and an outlet for liquid for the lower compartment, the partition sloping upwardly toward the constantly open aperture.

4. A water replenisher for cooking vessels comprising means providing a liquid reservoir adapted to be positioned in a cooking vessel, said reservoir being divided by a partition into two compartments arranged one above the other, there being an outlet from the lower compartment adjacent its bottom, and a constantly open aperture in the partition establishing communication between the compartments, said partition sloping upwardly to said constantly open aperture.

RALPH ASH.